United States Patent [19]

Heidrich et al.

[11] Patent Number: 5,364,309
[45] Date of Patent: Nov. 15, 1994

[54] RESILIENT-MEMBRANE COUPLING ELEMENT FOR USE IN A TORQUE TRANSMISSION PATH, AND METHOD OF MANUFACTURE

[75] Inventors: Guenther Heidrich, Burgberg; Siegfried Muller, Kempten, both of Germany

[73] Assignee: BHS-Bayerische Berg-Hutten-und Salzwerke AG, Munich, Germany

[21] Appl. No.: 761,972

[22] PCT Filed: Mar. 9, 1990

[86] PCT No.: PCT/EP90/00386

§ 371 Date: Nov. 5, 1991

§ 102(e) Date: Nov. 5, 1991

[87] PCT Pub. No.: WO90/10801

PCT Pub. Date: Sep. 20, 1990.

Pat. No. 5,364,850 /Top; Cols. 5, 58, 59, 60 /Nov. 15, 1994

[30] Foreign Application Priority Data

Mar. 10, 1989 [DE] Germany .................. 3907855

[51] Int. Cl.⁵ .................................. F16D 3/79
[52] U.S. Cl. ........................ 464/99; 464/147
[58] Field of Search ................ 464/98, 99, 147

[56] References Cited

U.S. PATENT DOCUMENTS

| | | | |
|---|---|---|---|
| 3,124,942 | 3/1964 | Rothfuss et al. | 464/99 |
| 3,543,537 | 12/1970 | Rothfuss et al. | 464/99 |
| 3,959,988 | 6/1976 | McNamee . | |
| 4,133,188 | 1/1979 | Cartwright | 464/99 |
| 4,191,030 | 3/1980 | Calistrat | 464/98 X |
| 4,276,758 | 7/1981 | Coman et al. | 464/99 |
| 4,560,364 | 12/1985 | Cohen | 464/99 X |
| 4,802,882 | 2/1989 | Heidrich | 464/99 |

FOREIGN PATENT DOCUMENTS

| | | |
|---|---|---|
| 026681A1 | 4/1981 | European Pat. Off. . |
| 211090A1 | 2/1987 | European Pat. Off. . |
| 8337492 | 11/1985 | Germany . |
| 1091121 | 11/1967 | United Kingdom . |

OTHER PUBLICATIONS

"Bendix Contoured Diaphragm Couplings" brochure, Bendix Fluid Division, Dec. 1982.
"Flexible Power Transmission Systems" brochure, Bendix Fluid Power Division, Feb. 1983.
"BHS Membrankupplung" brochure, BHS Werk Sonthofen, Apr. 1985.

*Primary Examiner*—Daniel P. Stodola
*Assistant Examiner*—Eileen A. Dunn
*Attorney, Agent, or Firm*—Brumbaugh, Graves, Donohue & Raymond

[57] ABSTRACT

A coupling element between tubular shaft sections comprises two mutually adjacent membrane walls, each having radially outer and inner circumferences. The membrane walls are mutually connected at their radially outer circumferences. The radially inner circumferences of the membrane walls are in axial alignment with radially inner circumferences of respective shaft sections, and the membrane walls are connected at their radially inner circumferences to the tubular shaft sections. The radially outer circumferences of the membrane walls are elastically decreasable, and the radially inner circumferences of the membrane walls are elastically expandable in response to axial forces applied to the membrane walls in axially opposite directions.

22 Claims, 15 Drawing Sheets

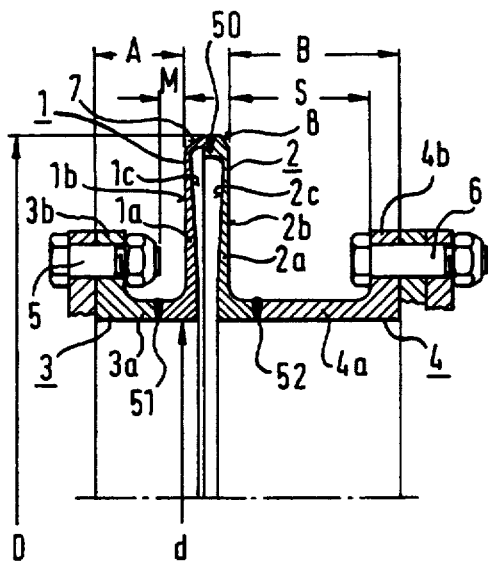
Fig. 1
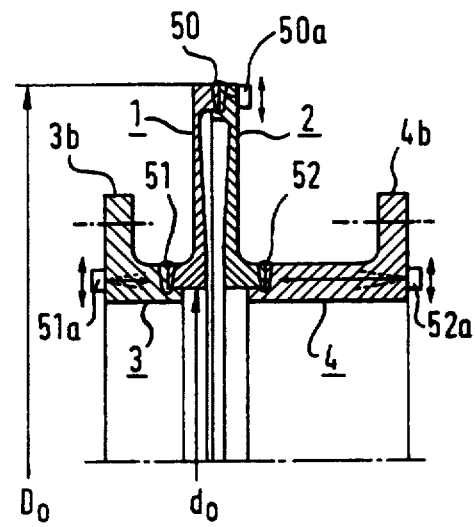
Fig. 2
Fig. 2a
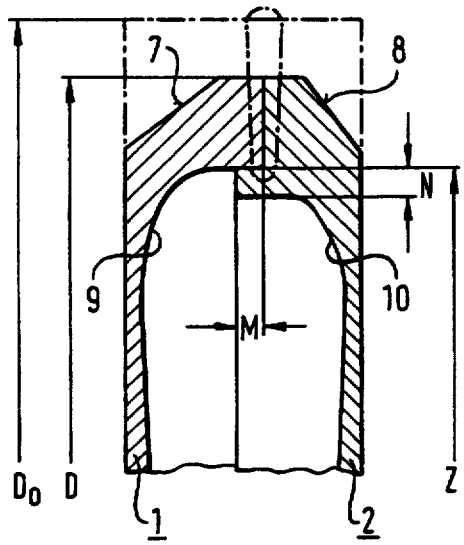
Fig. 3
Fig. 4
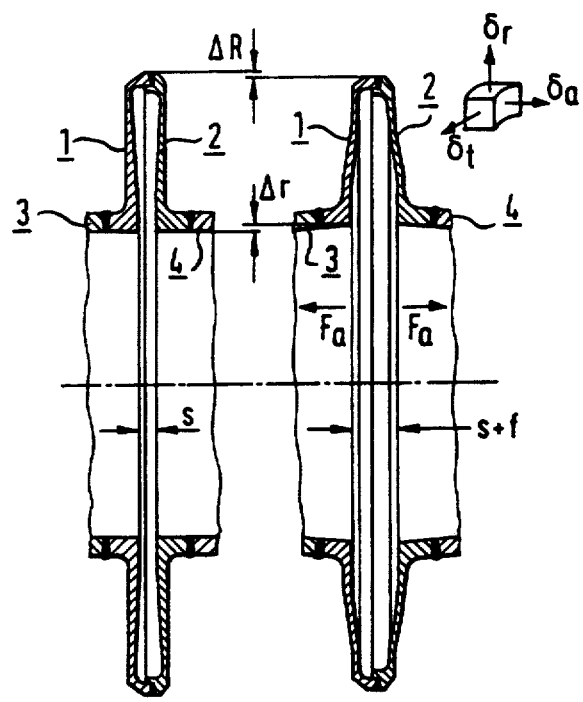

RESILIENT-MEMBRANE COUPLING ELEMENT FOR USE IN A TORQUE TRANSMISSION PATH, AND METHOD OF MANUFACTURE

The invention relates to a flexurally resilient coupling element consisting of two membrane discs connected to each other in their radially outer peripheral zone and at least one connecting part welded onto the radially inner periphery of one of these membrane discs.

Such a coupling element is known from EP-A1 211 090.

Where such a coupling element is concerned, the invention is based on the problem of ensuring that the tension pattern within the coupling element, particularly under tractively incident axial forces and angular deflections due to radial and angular offset between adjacent shafts is more favourable.

In order to resolve this problem, it is according to the invention proposed that radially inwardly directed peripheral surfaces on the connection part and on the associated membrane disc which are situated in the radially inner peripheral zone are flush with and adjacent one another and in that the radially outer connecting zone of the membrane discs and the radially inner connecting zone of the connection part and of the associated membrane disc are so radially resilient that in the event of a deformation of the membrane discs by an increase in the axial gap between the membrane discs in their radially inner peripheral zones there can be a resilient reduction ΔR in diameter of the radially outer connecting zone and a resilient increase Δr in diameter of the radially inner connecting zone.

For a favourable tension pattern, it is furthermore advantageous if radially outwardly directed peripheral surfaces of the connection part and of the associated membrane disc which are situated in the radially inner peripheral zone are flush with and adjacent one another.

The basic thought underlying the invention is particularly applicable if a sleeve-shaped connection part is adjacent the radially inner peripheral zone of each membrane disc, these connection parts being directed away from one another. At the same time, the connection parts may have at their remote ends respective radially outwardly directed radial flanges, particularly screwed flanges.

Having regard to differing installation circumstances, it is recommended that the radial flanges be at different axial distances from the relevant associated membrane disc. In particular, this provides an opportunity whereby the radial flange which is disposed at a shorter axial distance from the associated membrane disc is at such an axial distance from the associated membrane disc that when screwed joints are applied, screwthreaded nuts can be incorporated between radial flange and the associated membrane disc and so that the other radial flange which is disposed at a greater axial distance from the associated membrane disc is at such an axial distance from the associated membrane disc that when screwed connections are applied, screwthreaded bolts can be incorporated between this radial flange and the associated membrane disc.

One possibility of trimming the inherent frequency of the coupling element to a desired level resides in incorporating between the two membrane discs, at least in the radially outer peripheral zone of the disc-shaped space enclosed between them a filling composition consisting in particular of an elastomeric material.

The coupling elements according to the invention are particularly suitable for the rotationally rigid transmission of high torque levels at simultaneously very high rotary speeds and they fulfil an equalising function in the event of axial, radial and angular offset between two coupled shafts, as the result of resilient deformation.

The invention further relates to a method of producing a flexurally resistant coupling element which consists of two membrane discs connected to one another in their radially outer peripheral zone and at least one connecting part welded onto the radially inner periphery of one of these membrane discs, the connection part and the said one membrane disc being constructed in the welded joint area with oppositely radially directed centring surfaces intended to bear on one another and with, intended to bear on one another, oppositely axially directed contact surfaces so that the two parts, namely the connection part and the said one membrane disc, can be fitted together in a centred and axially established relative position, the contact surfaces being radially outwardly adjacent the centring surfaces and being accessible from radially outside for electron-beam welding, and where, after the parts are fitted together, in the contact zone of the contact surfaces, an electron-beam weld or laser welded seam is produced in the contact area of the contact surfaces, from radially outside.

Such a method is likewise known from EP 0 211 090 A1. In that case, after the welding together in the region of the contact or counter-contact surface, the radially innermost area of the connection part remains within the associated membrane disc. Thus, the connection between the membrane disc and the connection part is based on the one hand on the welding of the contact surfaces and on the other on the way the centring surfaces bear on one another. The stress pattern under a flexural loading is undefined, the more so since in the case of the known method there are no stipulations concerning the depth of the electron-beam weld. Furthermore, the part of the connection part which is disposed within the membrane disc constitutes an additional mass which does not contribute to the transmission of torque.

Therefore, the invention is furthermore based on the problem of modifying the above-mentioned method to produce a more favourable and technically more easily controlled stress pattern without any reduction in torsion loading capacity.

In order to resolve this problem, it is according to the invention proposed that the electron-beam weld or laser welded seam should extend radially inwardly at least as far as the centring surfaces whereupon at least the material located radially inwardly of the centring surfaces of one or other part is removed.

In the case of the procedure according to the invention, the result is that the radially inwardly directed peripheral surfaces of the connection part and of the associated membrane disc which are disposed in the radially inner peripheral zone are flush with and adjacent one another. The result is a quasi-monolithic coupling element with a favourable and mathematically easily ascertained stress distribution at the transition between the relevant membrane disc and the associated connection part. In the connection between this membrane disc and the connection part there is no abrupt variation in the stress conditions under flexural or torsional loadings.

Preferably, then, the electron-beam weld or laser weld seam is caused to penetrate radially inwardly beyond the centring surfaces and into the material of the part in question. Thus it is possible with a minimum of material removal to ensure that the weld seam is also free from cavitation at its radially inner end.

The centring and contact surfaces which come together upon assembly can be made ready in that the connection part is provided with a radially outwardly and open axially in respect of the associated membrane disc an annular surface which forms the contact surface on the connection part side and the centring surface on the connection part side and which is radially inwardly defined by an annular projection adapted to be fitted into a bore in the said membrane disc and in that after welding material is removed from the inside of the connection part and over the radial height of the annular projection.

The two membrane discs can also be welded together in radially outer membrane zones by electron-beam or laser welding possibly in the manner described in European Published Specification No. 211 090.

A preferred production method resides in that the membrane discs are at their radially outer periphery produced with a thickness of material which facilitates production of the membrane discs particularly on lathes, and in that after welding of the membrane discs, the thickness of material in the radially outer zone of the membrane discs is reduced by the removal of material, particularly on a lathe, to a degree which increases the flexural softness there, particularly once at least one connecting seam to a connection part has been produced. In this way, on the one hand, production of the membrane discs and the welding are facilitated. The coupling element blank obtained by the welding can then as a whole be more easily clamped and subjected to the removal of material resulting in its final shape and flexural softness. The outside diameter of the membrane disc can be reduced thereby and any excess on the radially outer welded seam can be removed for balancing purposes. Furthermore, it is possible for the transition from the relevant outer peripheral surface of one membrane disc to the end face of the relevant membrane disc which is remote from whichever is the other membrane disc to be chamfered on at least one membrane disc surface. In this way, it is also possible at this point to overcome any inconsistencies in the stress pattern under flexural loadings.

For fixing-related reasons, it is recommended that the two membrane discs are welded together before the weld to the connection part is made.

In order to obtain a high contact pressure between the contact surfaces after the membrane discs have been welded, when the connection part or parts is or are welded on, it is suggested that welding of in each case one membrane disc to the associated connection part and particularly the welding of the two membrane discs to in each case one connection part is undertaken while pressing the relevant connection part against the relevant membrane disc while the two membrane discs are braced against each other on their radially inner periphery through spacers and in that the said spacers are removed after welding-on of the connection part or parts.

In order to provide in the region of the coupling element an alignment safeguard and/or an additional bearing and/or a radial restriction and/or an axial restriction, then one possibility is that after the membrane discs are connected at their radially outer periphery and after the connection of a connection part to at least one of the membrane discs as bridging sleeve is incorporated into one membrane disc and/or into its associated connection part to bridge the gap between the two membrane discs, being disposed opposite and at a distance from the inner periphery of the other membrane disc and/or the inner periphery of the connection part associated with this latter.

According to a preferred manner of carrying out the method, it is envisaged that a coupling element is produced with one connection part on each of the two membrane discs, each of these connection parts consisting of an axially directed connection sleeve and, directed radially outwardly at that end of the connection sleeve which is remote from the membrane disc, a connection flange, particularly a screwed flange. The coupling element produced by this method is versatile and can in fact be used on the most widely diverse shaft constructions between adjacent parts of a machine plant.

The versatility can be further enhanced in that of the two connection elements, one connection element is produced at the smallest possible flange distance from the associated membrane disc which allows incorporation of a nut on a screw bolt inserted axially towards the relevant membrane disc and in that the other connection element is constructed with a flange spacing from the associated membrane disc which allows the insertion of a screw bolt in an axial direction from the annular space between the relevant flange and the relevant membrane disc.

If, on a basis of the same membrane disc outside diameter coupling elements are produced in which the membrane discs are of different inside diameter, then it is possible in the case of the embodiment which has the larger membrane disc diameter to accommodate any connection hubs within the coupling element while in the case of the embodiment having the smaller inside diameter of membrane disc, the connection hubs can be allowed to project from the coupling element. If this principle is applied to membrane discs of different outside diameter, then it is possible without maintaining any large overall stocks to have a set of coupling elements available which will in each case provide the correct coupling element for most situations which are likely to arise.

Examples of embodiment of the invention are explained in detail hereinafter with reference to the accompanying drawings, in which:

FIG. 1 shows a longitudinal section (half-section) through the coupling element according to the invention, namely a standard element in the complete and installed condition;

FIG. 2 shows the coupling element according to FIG. 1 during assembly;

FIG. 2a is an exploded view of a detail in FIG. 2;

FIG. 3 shows portion of the outer membrane zone of the coupling element;

FIG. 4 shows a portion of the coupling element once in the unladen and once in the laden state;

FIG. 1 shows the standard element according to the invention in a completely installed state.

Figure 5:
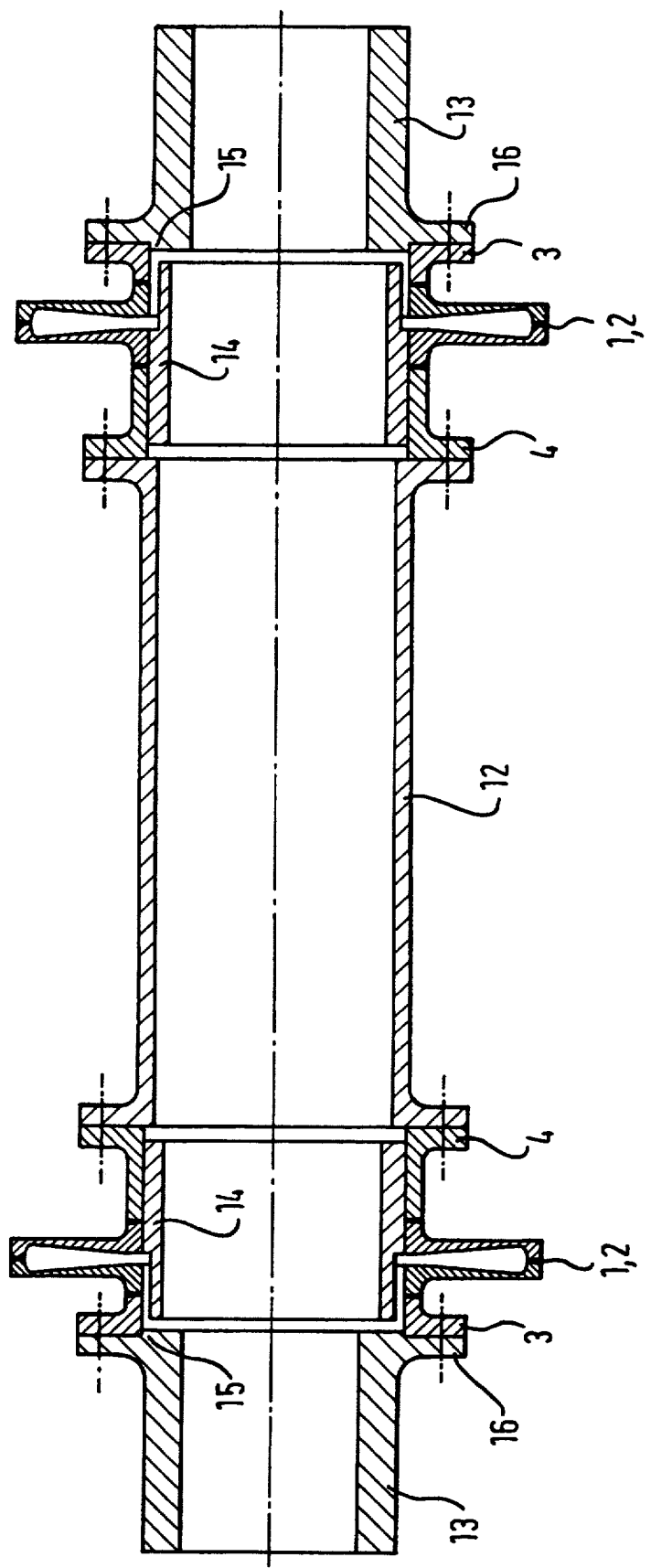
FIG. 5 shows a shaft arrangement with coupling elements according to the invention and laterally disposed shaft hubs.

This coupling element consists of membrane discs 1, 2 and connection parts 3, 4. The membrane discs 1, 2 and the connection parts 3, 4 are connected by electron-beam welding at the locations 50, 51 and 52. The connection parts 3, 4 consist in each case of a thin-walled sleeve 3a or 4a with an attached flange 3b, 4b. Torque transmission takes place at the flanges 3b and 4b by means of the screws 5, 6 which establish the connection with connecting flanges on a shaft arrangement.

The distances A, B from the flanges 3b, 4b to the membrane discs 1, 2 vary in size and are minimised in consideration of screw and nut assembly. For example, the intermediate space M required to fit the nut on the screw 5 determines the minimum gap A while the intermediate space S for fitting the screw 6 determines the minimum gap B.

Following the electron-beam welding stage, the membrane discs 1, 2 are externally turned down to the diameter D and are provided with chamfers 7, 8.

Furthermore, the connection parts 3, 4 are, likewise following electron-beam welding, turned out on the inside to the same diameter d dependent upon the transmissible torque and corresponding to the inside diameter of the membrane discs 1, 2.

The flexible disc portion 1a, 2a of the membrane discs 1, 2 is formed in each case by a flat end face 1b, 2b and an outwardly cortically extending end face 1c, 2c. The end faces 1b, 2b facilitate production of the membrane discs 1, 2 in that they are used as bracing surfaces when producing the thin-walled zones 1a, 2a.

FIG. 2 shows the state of the standard element during production. The secondarily machined diameters D, d (FIG. 1) bear the following relationship to the original diameters $D_o$, $d_o$ (FIG. 2):

$$D < D_o \text{ and } d > d_o.$$

FIG. 2a shows the radially inner portion of the membrane disc 22 and the associated connection portion of the connection element 4. Provided on the connection element 4 is an annular recess 4d which forms a contact surface 4c and a radially outwardly directed centring surface 4f. The annular recess 4d is defined by an annular projection 4g. Provided on the membrane disc 2 is a contact surface 2d and a radially inwardly directed centring surface 2e. When assembling the unit according to FIG. 2, firstly the membrane discs 1 and 2 are fitted together and welded to each other at 50. Then the connection parts 3 and 4 are attached so that the contact surfaces 2d and 3c come to bear on each other and also the centring surfaces 4f and 2e come to bear on each other. Then the welded seams are made at 51 and 52. Finally, the crude coupling element which is thus formed is subjected to a secondary turning operation in that the inside diameter is turned out to the dimension d (FIG. 1) and in that furthermore the outside diameter is turned off from dimension $D_o$ down to dimension D while at the same time the chamfered surfaces 7, 8 are produced by turning. Furthermore, FIG. 2 shows the ready-for-testing construction of the welded joints 50, 51, 52 which have been prepared for ultra-sonic examination. By this method, it is possible in particular to detect internal welding errors which are of the utmost importance for such heavy duty couplings. It is evident how by means of conventional testing heads 50a, 51a, 52a, a hundred percent irradiation of the weld cross-sections is possible both before and also after final machining of the membrane discs and connection parts. This guarantees that the coupling element can also be tested for freedom from cracks even during inspections after periods of operation.

Surface cracks can also be established by the simpler method of colour penetration. Due to the accessibility to the secondarily machined inner surfaces of the sleeves 3a and 4a and membrane discs 1 and 2, the two inner welds can also be tested from the inside to trace surface cracks.

FIG. 3 shows the construction of the outer marginal portion of the membrane discs 1, 2 in FIG. 1. Minimising the cross-section in relation to high stability of design and considerable radial elasticity is achieved by a particular geometry, namely the bilateral chamfers 7, 8, the parabolic transition contours 9, 10 and the infinitely variable transition from the centring diameter Z into the transition contour 9. The centring collar dimensions M and N are minimised with a view to the electron-beam welding and the centring ability.

Also in the area of the root of the membrane discs 1 and 2, transition contours are provided between the end faces 1b and 2b and the cylindrical outer peripheral surfaces which serve to exclude any possibility of notch effects. These transition contours can likewise be of parabolic form, as indicated at 9 and 10. With regard to the chamfers 7 and 8, it should be added that these chamfers 7 and 8 could lead to the falsification of results during subsequent welded seam tests using the test head 50a. Therefore, in accordance with a further embodiment, it is envisaged that the chamfered surface 8 be omitted and that the chamfered surface 7 be steeper, i.e. should enclose a smaller angle with a plane perpendicular to the axis and should open out into the surface 1b radially within the diameter Z.

FIG. 4 explains the effect of the radial elasticity of the radially inner and radially outer cross-sections upon axial deformation. The picture on the left shows a portion taken from the double membrane in the unladen condition while the right-hand picture shows the same portion subject to axial forces $F_a$ which exert a pulling effect. The distance s is increased by the spring travel f. As a result of the resultant bulging, the stresses $\sigma_r$, $\sigma_a$, $\sigma_t$ (r means: radial, a means: axial, t means: tangential) form in the resilient membrane surface, the directions of their effects being shown on a small part of the surface area. If, then, the inner and outer marginal zones of the double membrane are radially resilient, then the inner diameters can enlarge by $\Delta r$ and the outer diameters diminish by $\Delta R$, which to a very great extent reduces the membrane stresses $\sigma$. The great effect of these measures has been demonstrated repeatedly by stress testing using strain gauges. The same effect occurs if the membranes are exposed to deformation due to angular deflection in the event of radial and angular offset of the shafts. Producing the final contours of the radially inner and radially outer marginal zones only after welding also has advantages with regard to finishing of the thin-walled areas 1a and 2a. The solid marginal zones present prior to welding in fact facilitate this production process particularly by better workpiece location, reduced susceptibility to distortion and vibration and easier attainment of high surface quality.

FIG. 5 shows a shaft arrangement comprising two coupling elements according to FIG. 1, an intermediate sleeve 12 and two hubs 13 flanged laterally onto the relevant parts 3. In the interior of the connection parts 4, there is in each case a separate annular insert 14 which is so disposed that it has one end extending with radial clearance into the relevant part 3. This represents a safety measure and prevents individual component parts becoming detached from the coupling if the membranes are forcibly broken. By virtue of the intermediate sleeve 12, the shaft length can be adapted to the particular installation situation involved. In order to be able to install or remove the two coupling elements including the intermediate sleeve 12 in the assembled state, it may from time to time be necessary to reduce the shaft length by the length of the two centring collars 15. The double membranes permit of this reduction in that by using simple aids the two membrane discs can be pushed together.

Except for the flange 16, the hubs 13 may be constructed in various ways so that any probable type of shaft/hub connection is possible. Should it not be possible to adapt the hub flange 16 to the flange 3b of the connection part 3, then by means of an intermediate flange, adaptation is possible and the coupling elements can remain unaltered.

Figure 6:
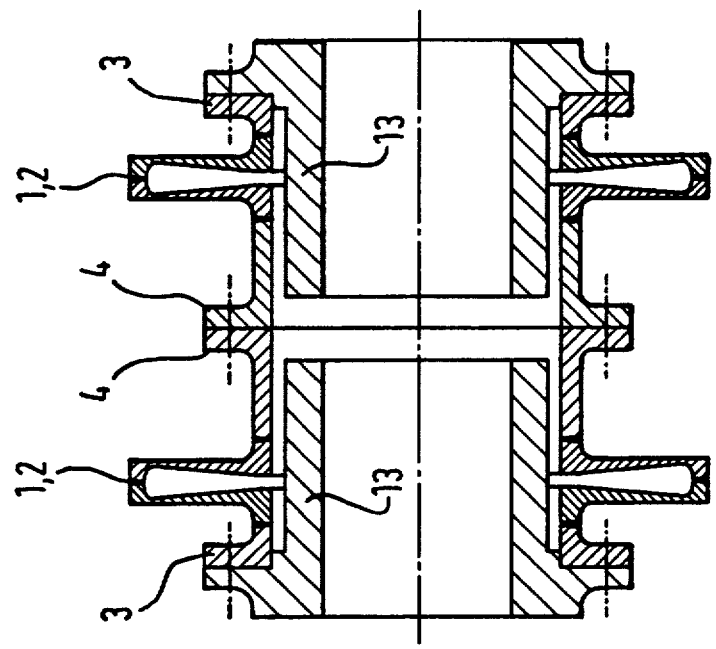
FIG. 6 shows a shaft arrangement with coupling elements according to the invention and shaft hubs fitted into them (shortened version)

FIG. 6 shows a short version of a shaft connection according to the invention. The design of the coupling element according to FIG. 1 makes it possible also to dispose the shaft hub 13 inside the relevant coupling element while the shaft diameter remains the same. The internally disposed hubs 13 at the same time fulfil the safety function of the insert 14 in FIG. 5 in the event of damage to the membrane.

The separable connection of the two coupling elements to the flanges makes it possible for coupled machines to be dismantled individually without their having to be displaced axially.

Figure 7:
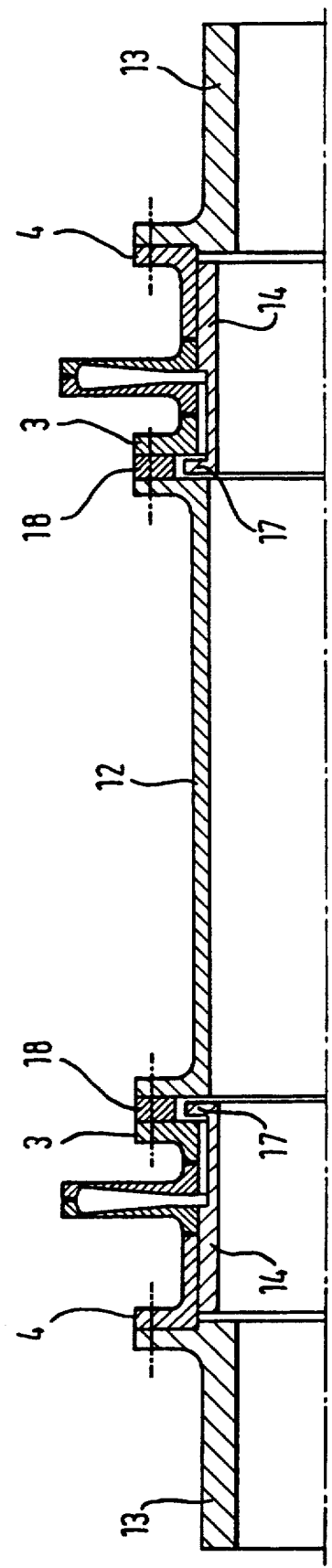
FIG. 7 shows a shaft arrangement using coupling elements according to the invention and with the additional provision of axial clearance limiting means.

FIG. 7 shows a shaft half with coupling elements according to the invention and which is capable of alternately transmitting external axial forces. These axial forces do not represent any loading on the membrane discs.

The insert 14 has for this function a flange 17 which engages the region of an intermediate disc 18. The transfer of an axial force takes place for instance from the hub 13 via the parts 4 and 14 and via the flange 17 to the intermediate sleeve 12. The flange 17 is angularly movable with minimal axial clearance in the space formed by the intermediate disc 18. The angular mobility of the double membrane is retained even with this construction.

Figure 8:
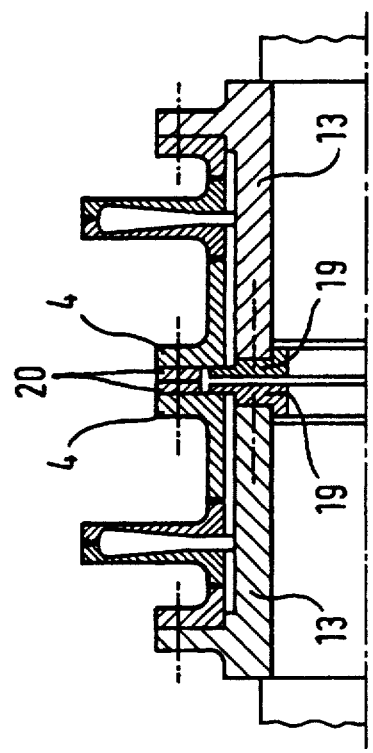
FIG. 8 shows an embodiment corresponding to the short version in FIG. 6 and provided with axial clearance limiting means.

FIG. 8 shows a shaft connection having the same function as in FIG. 7 but in the short version shown in FIG. 6. For the transmission of an axial force, flanges 19 are fitted on the hubs 13. Two intermediate discs 20 provide a space for the flanges 19. As a result of the disposition of the intermediate discs 20, easy installation and removal of the machines together with the coupling elements and without any axial displacement remains feasible.

Figure 9:
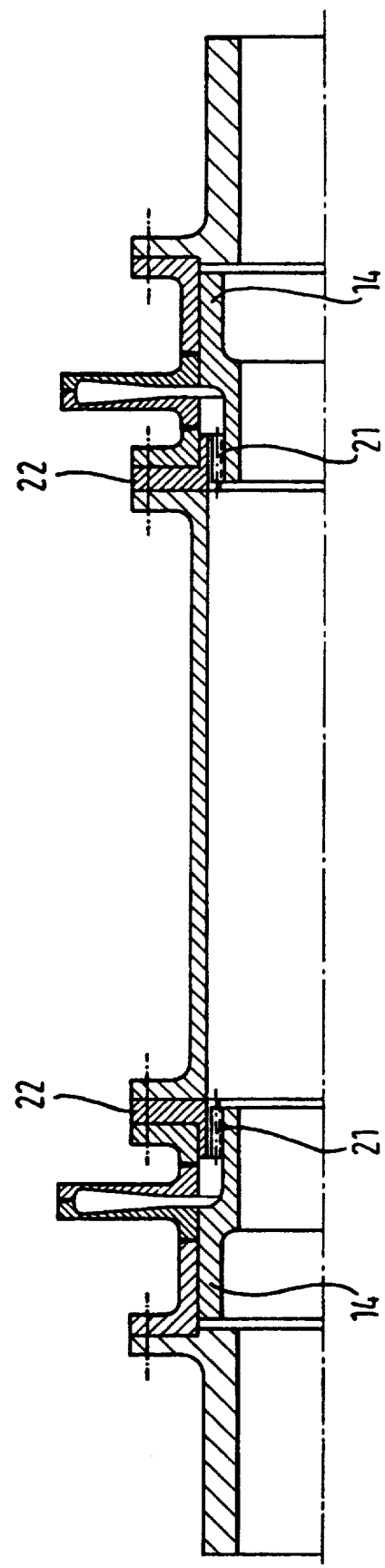
FIG. 9 shows an embodiment similar to that in FIG. 5 and provided with an emergency shut-down device.

FIG. 9 shows a shaft connection with coupling elements according to the invention in which there is as an additional function an "emergency shut-down" in the event of membrane breakage. For this purpose, the insert 14 has teeth 21 which engage with increased flank clearance into a set of teeth on an intermediate disc 22. The increased flank clearance will under normal circumstances prevent the transmission of torque by flank contact. In the event of damage, the torque is very briefly transmitted through this pairing of teeth.

Figure 10:
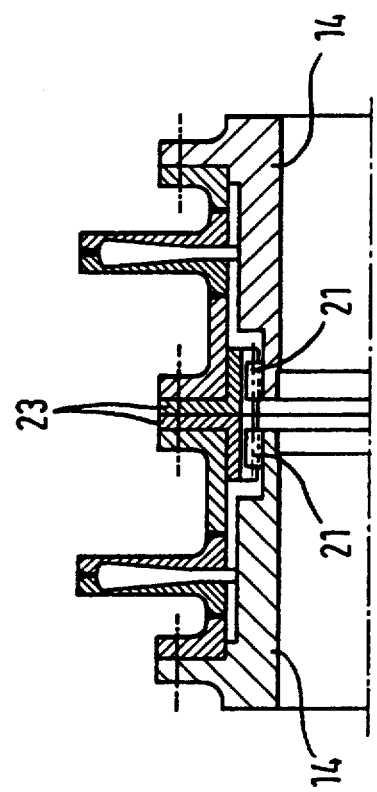
FIG. 10 shows an embodiment similar to that in FIG. 6 and provided with an emergency shut-down device.

FIG. 10 shows a shaft connection having the same function as in FIG. 9 but in the short version according to FIG. 6. The disposition of two intermediate discs 23 serves in turn to aid simple fitment and removal of the machines with the coupling halves without axial displacement. Also in the embodiment shown in FIG. 10, the toothed couplings 21 are disposed between the inserts 14 on the one hand and the intermediate discs 23 on the other, as shown in and described with reference to FIG. 9.

Figure 11:
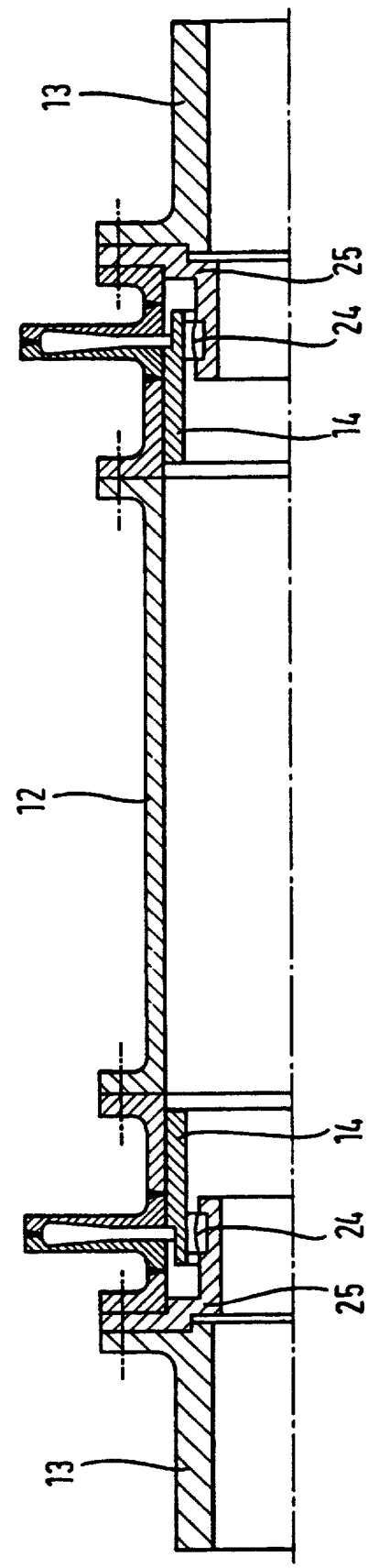
FIG. 11 shows an embodiment similar to that in FIG. 5, with an additional inner bearing.

FIG. 11 shows a shaft connection half with coupling elements according to the invention in which in addition for the case of long and heavy intermediate sleeves 12 the weight of the membrane discs is compensated for by angularly movable radial bearings 24 in the region of the median planes through the double membranes. The weight of the intermediate sleeve 12 is supported directly on the relevant shaft hub 13 through the radial bearings 24 and flanges 25. In order not to impede the elasticity of the double membranes, there is provision for axial mobility between the inserts 14 and the radial bearings 24.

Figure 12:
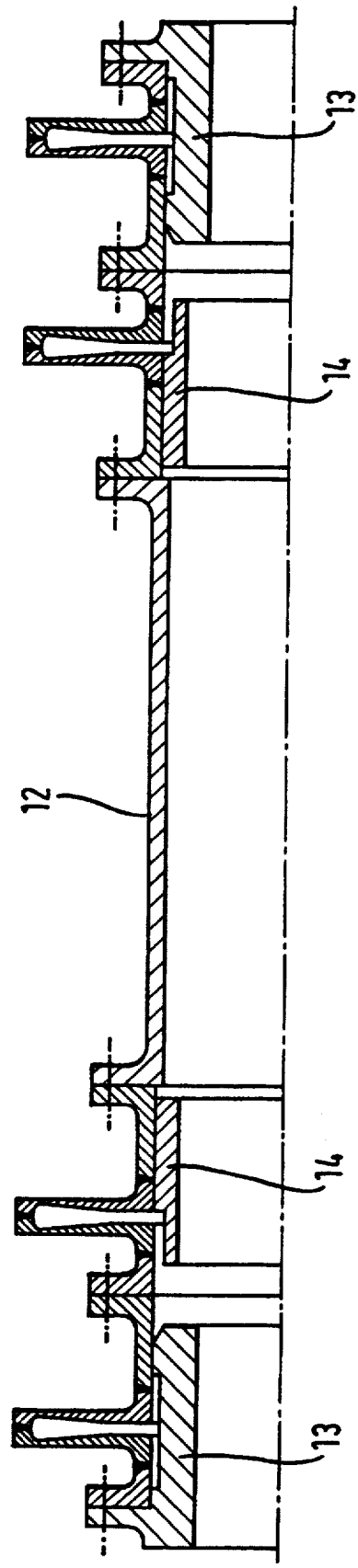
FIG. 12 shows an embodiment which follows on from that in FIG. 6, with in each case two coupling elements in a tandem layout at both ends.

FIG. 12 shows a shaft connection with coupling elements according to the invention in which in order to increase the axial elasticity or resilience, in each case two coupling elements are disposed one behind the other in a tandem arrangement. In this case, the coupling element disposed directly at the hub 13 can be rigidly disposed angularly by being radially braced on the hub 13 without the increase in axial elasticity being called into question.

Figure 13:
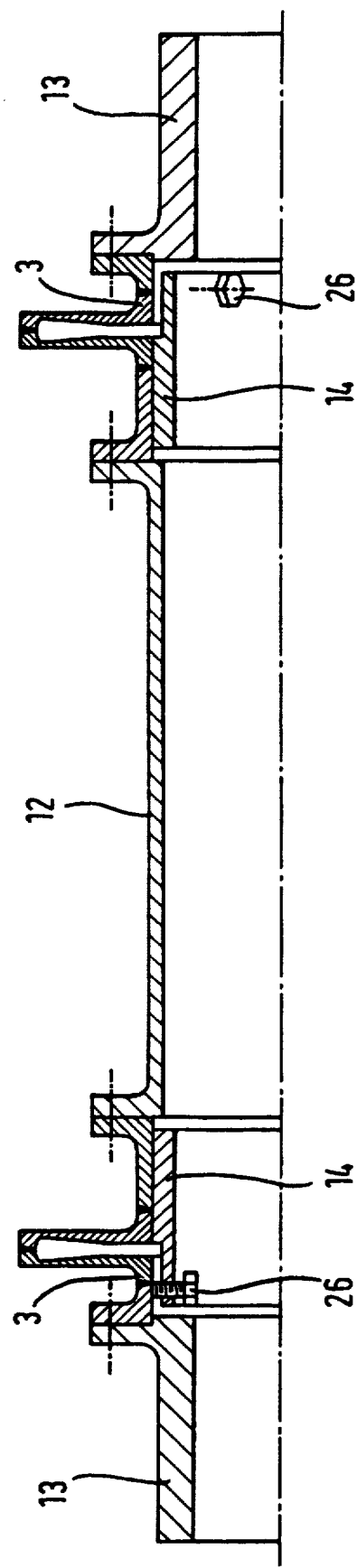
FIG. 13 shows the embodiment according to FIG. 1 with radially rigid double membranes for the balancing period.

FIG. 13 shows a shaft connection with coupling elements according to the invention in the situation during complete balancing.

Prior to fitting the shaft arrangement shown in FIG. 13 into a balancing machine, this arrangement is set up on a jig and aligned by means of screws 26; the alignment can then be checked by true running equipment. Then perfect true running of the shaft arrangement is guaranteed when it is used with its hubs 13 in roller bearings in the balancing machine. In the situation where it is rigidly clamped by the setting of the screws 26, the shaft connection can be dynamically balanced without any problem. The clamped coupling corresponds exactly to the installed condition which arises when the machines to be coupled are aligned faultlessly in respect of one another (nil alignment). Thus, the balancing which is made possible by the invention is substantially identical to an operational balancing and guarantees optimum running accuracy at the highest rotary speeds.

For the temporary fitment of the screws 26, radial screwthreaded holes are provided in the inserts 14 or also in the oppositely disposed sleeves of the connection parts 3.

Figure 14:
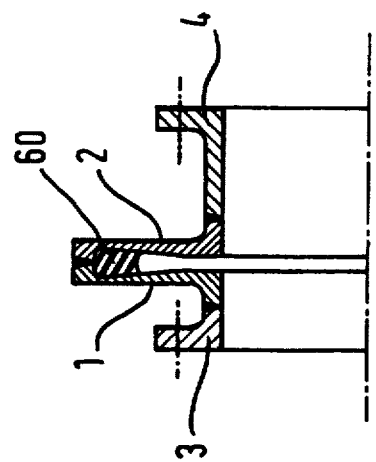
FIG. 14 shows a coupling element according to FIG. 1 with an elastomeric material in the interior of the double membrane.

FIG. 14 shows half a membrane coupling which consists of two membrane discs 1, 2 and the connection parts 3, 4 with more detailed information, substantially according to FIG. 1. An elastomeric material is vulcanised into the interior of the double membrane 1, 2, forming a rubber/metal bond.

Elastomers are capable of providing a springing, damping and insulating effect. Accordingly, it is possible by using the elastomeric material 60 subsequently to change the axial and angular rigidity of the double membrane 1, 2 which in turn influences the inherent frequency of the coupling. Thus it is possible so to shift resonance speeds that the operational safety of the plant as a whole is not jeopardised. The existing damping effect of the elastomeric material acts protectively on the connected appliances, above all in the resonance ranges. This increases the effective life of the plant as a whole. The magnitude of rigidity and damping can be varied by the degree of filling (the mass of the incorporated elastomeric material) as well as the shore hardness of the elastomeric material. The mass and the moment of inertia of the coupling as a whole is only increased to a negligible degree due to the low specific weight of the elastomer. The insulating property which is also provided reduces the transmission of body noise and so has a sound-reducing effect.

Vulcanisation is carried out during rotation and using modern bonding systems. According to the nature of the elastomeric material, it is possible to achieve a direct bond with the metal or suitable adhesives are applied to the metal beforehand. Due to rotation, the initially fluid elastomeric material is distributed by centrifugal action. This must be maintained until such time as the material is, due to the progressive vulcanisation, sufficiently solidified to retain its distribution.

Figure 15:
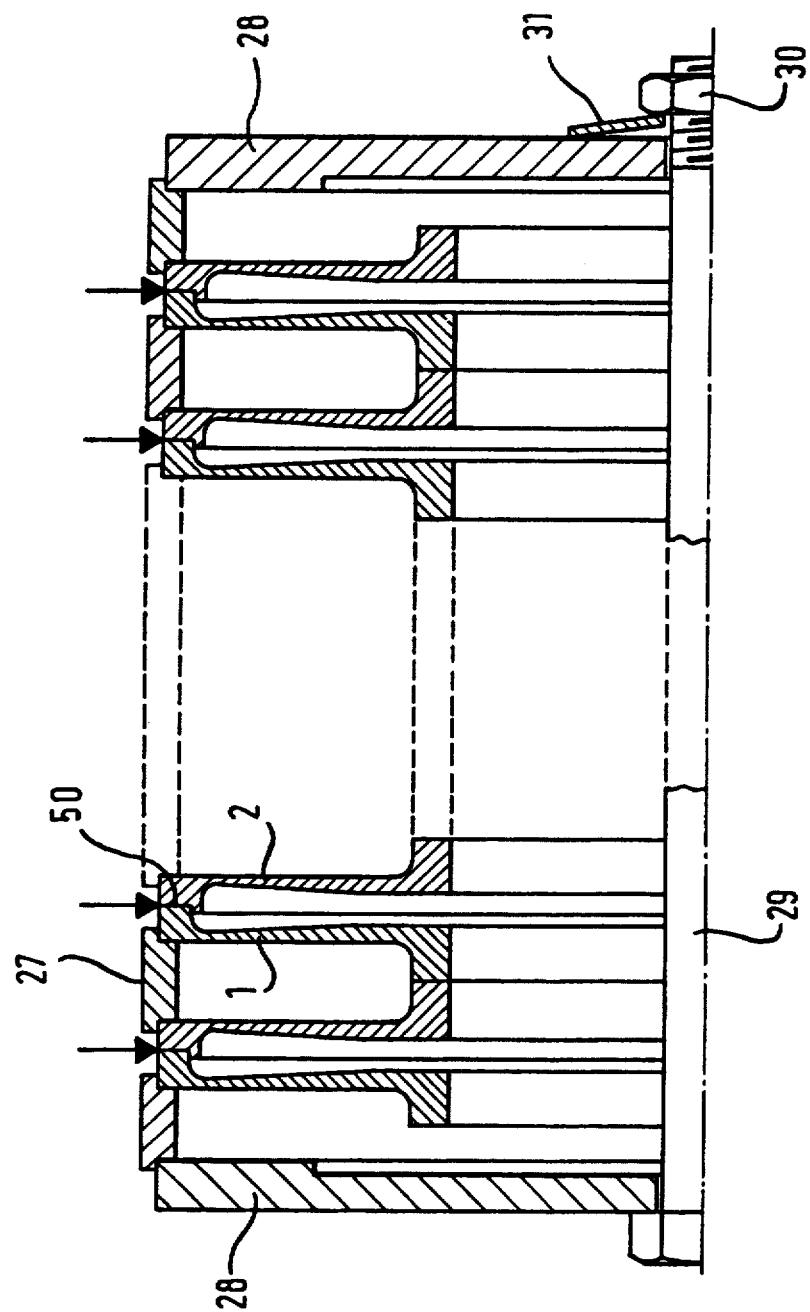
FIG. 15 shows a longitudinal section (half-section) through a work-locating fixture for external welding of the double membranes.

FIG. 15 shows a work-locating device for the external welding operations 50 which are preferably first conducted on several double membranes 1, 2. The necessary clamping of the membranes 1, 2 is carried out by identical one-piece spacer rings 27, the two end discs 28, a clamping bolt 29, a nut 30 and a spring washer 31. The spring washer 31 compensates elastically for axial shrinkage during the welding operations and so prevents welding errors caused by gaps in the welded joints.

Figure 16:
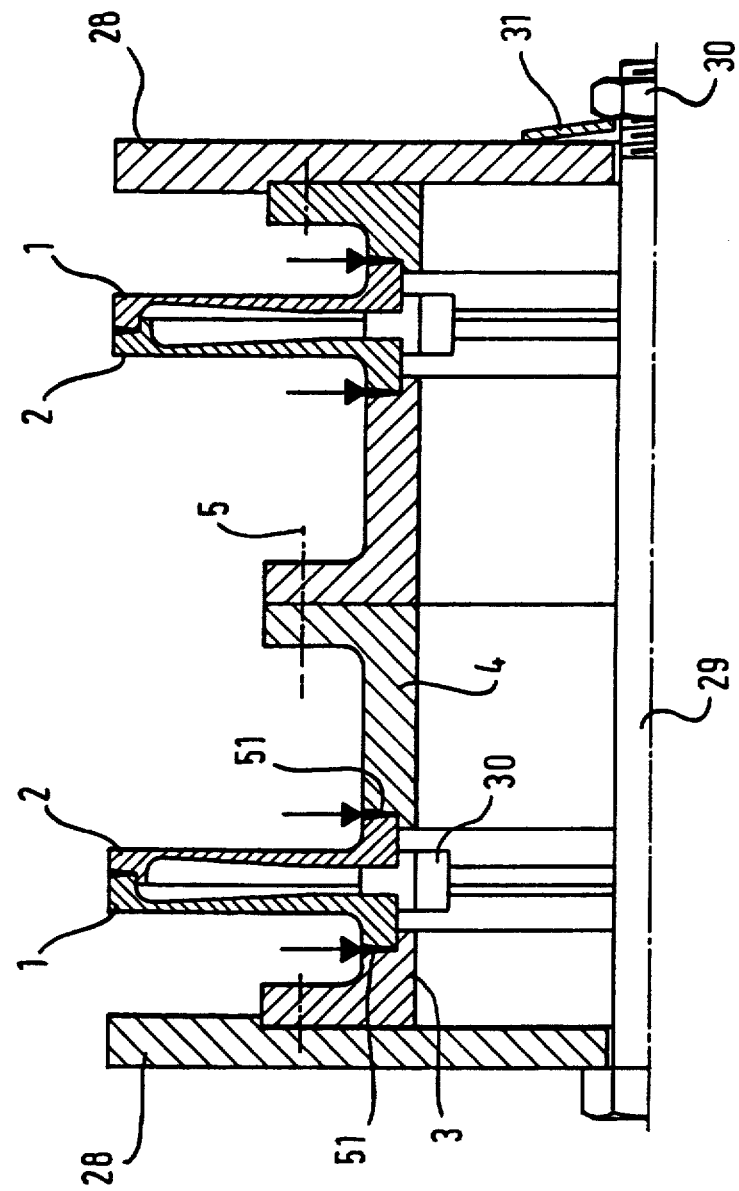
FIG. 16 shows a work-locating fixture for internal welding of the coupling elements.

FIG. 16 shows a work-locating device for the internal welds 51 on a plurality of coupling elements which can again be constructed as shown in FIG. 1. Here the parts 1, 3 and 2, 4 are clamped by using a number of identical segment-like spacer rings 30 between associated membrane discs 1, 2. During clamping, the clamping bolt 29, the but 30 and the spring washer 31 are again used, the resilience between the radially inner portions of the membrane discs 1 and 2 being prevented by the fact that the spacer rings 30 are put together like segments. After welding, the spacer rings 30 can be removed again easily by slightly expanding the double membrane. The number of double membranes (FIG. 15) or coupling elements (FIG. 16) which can be disposed in the work-locating device simultaneously depends upon the dimensions of the welding machine chamber available. If there are more than two coupling elements, the two connection parts 4 are centred and bolted together by means of the screws 5 (FIG. 1).

Figure 17:
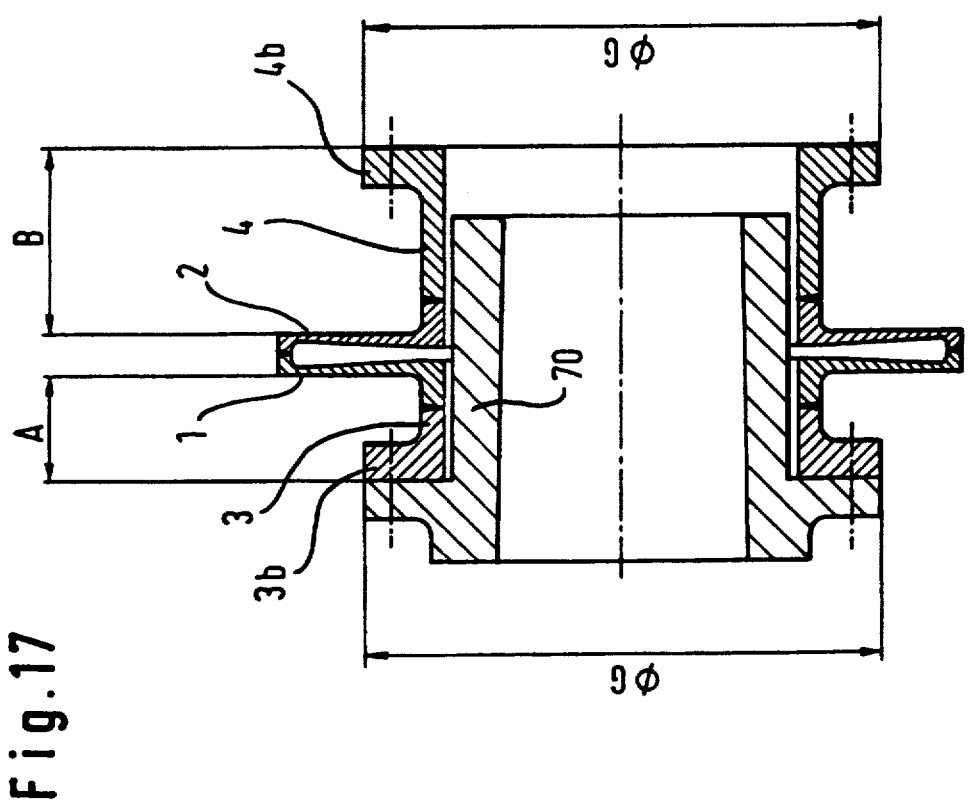
FIG. 17 and FIG. 18 show coupling elements of the same outside diameter and having different inside diameters and a different shaft hub fitting.

FIG. 17 shows a coupling element 1, 2, 3, 4 with connection flanges 3b and 4b. A hub member 70 is inserted into the coupling element from the left, and fastened to the flange 3b by a counter flange. The hub member 70 extends across the gap between the membranes 1, 2. The inner face of the hub member 70 is conical, for receiving a conical external face of an adjoining shaft section.

Figure 18:
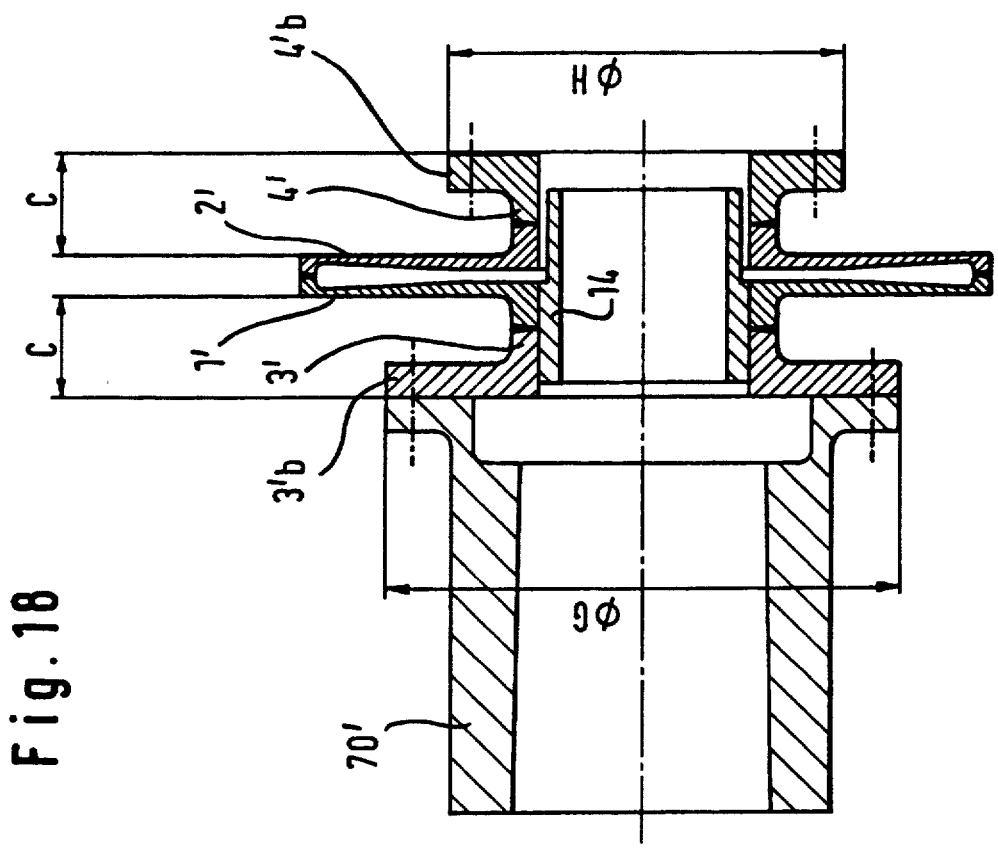

FIG. 18 shows a coupling element 1', 2', 3', 4' with connecting flanges 3'b, 4'b. A hub member 70' is flanged to the flange 3'b. The hub member 70' has an internal conical face, for receiving a conical external face of an adjoining shaft section. A separate insert sleeve 14 is included for bridging the gap between the two membranes 1', 2'.

In FIGS. 17 and 18, the outside diameters of the membrane discs are the same. In FIG. 17, the outside diameters of the flanges 3b and 4b are also the same; in FIG. 18, the outside diameter G of the flange 3'b is larger than the outside diameter H of the flange 4'b. In FIG. 17, the axial dimensions A and B are different; in FIG. 18, the axial dimensions C are the same. In FIG. 18, the radial dimensions of the membranes 1' and 2' are larger than the radial dimensions of the membranes 1, 2 in FIG. 17. As a result, the embodiment according to FIG. 18 provides a larger degree of elastic deformability.

The major industrial and economic significance of the embodiment of a coupling element according to the invention will be summarised hereinafter. The particular feature of the invention consists inter alia in that comprehensive optimisation is achieved by a simple and uniform standard coupling element. It is versatile in use without alteration. The transmission systems which can thus be obtained fulfil the exacting industrial requirements to an extent which has not been attained hitherto.

The all-round, self-substance connection of the parts of the standard element by electron-beam welding provides a high degree of functional and operational safety hitherto unattained by the prior art separable types of connection when transmitting high torque levels at ultra-high speeds and deformations. In terms of torque transmission over the entire cross-section which is minimised for maximum rigidity of design, the standard coupling element enjoys complete utilisation of the material; there are no areas of the cross-section which do not transmit torque. As a result of this sensible and lightweight construction, the dimensions and wall thicknesses are extremely small as are also the mass and the moment of inertia.

The coupling elements according to the invention require no maintenance and permit of inspections at considerable intervals of time.

The sizing of the standard coupling element and the bilateral disposition of flanges with minimised unequal distances from the double membrane make for the universal usefulness of the coupling element within a range and also a plurality of alternative constructions.

Thus, the standard coupling element can be used without alteration, with attached shaft flanges, with shaft hubs, which are disposed laterally of or within the coupling element, in the case of shaft hubs with all the likely types of shaft/hub combinations as well as with intermediate shafts of different functions and sizes.

Further embodiments are made possible by the separate and separable disposition of the annular insert 14 (FIGS. 5, 7, 9, 11, 12) in the connection part 3 or 4. This feature makes it possible to construct the insert 14 in accordance with the relevant embodiment, without changing the standard coupling element.

If further supplementary parts such as for example 18, 19, 20, 22, 23, 24, 25 are required, then these can be fitted on the flanges of the standard coupling element or on the shaft hubs 13.

In addition, the insert 14 fulfils a safety function in that in the event of damage to the membranes, detachment of the parts disposed between the two double membranes is prevented. Due to the relatively small diameters of the inserts 14, the coupling mass is only negligibly increased.

Whatever the variation in construction, none of these measures alters the standard coupling element.

Standardising the standard coupling element also drastically reduces production costs: it is possible for the coupling element to be prefabricated in various torque-dependent sizes and stocked as complete assemblies. During prefabrication, welding can be performed simultaneously on a plurality of elements, in accordance with FIGS. 15 and 16. Consequently, the equipment costs are reduced as well as the costs of evacuating the welding chamber and for heat treatment after welding in a vacuum furnace, in accordance with the number of elements which have to be provided simultaneously.

Stock holding also constitutes a substantial reduction in delivery time for such couplings, which is very important in coupling construction.

The standard coupling element permits of particularly large axial and angular deformation. This important advantage is achieved by the use of the double membrane. Compared with the single-membrane joint, the possible deformations are doubled and the spring stiffness is also reduced by half.

The possibilities of deformation are further enhanced by the high radial elasticity of the inner and outer marginal portions of the double membrane. These elasticities reduce the membrane stresses in the case of deformations, compared with the radially rigid constructions which have only one membrane disc.

The thin-walled design of the inner and outer marginal portions also enlarge the resilient membrane area in between. This results in an even greater deformability and once again to lesser spring stiffness.

Finally, lesser spring stiffness reduces the restoring forces on the shafts to be coupled. The particularly great reduction of these forces by the use of the standard coupling element according to the invention enhances quite decidedly the advantage of this coupling over prior apt membrane and toothed couplings.

The standard coupling element makes it possible easily to examine the welded joints even after periods of operation, using the well-known non-destructive testing methods.

Subsequently turning out the membranes 1, 2 and/or the sleeves 3a, 4a furthermore permits the welded joints to be tested from the inside outwards. It also increases the safety of the weld at these locations which are subject to particularly high stresses, since the weld roots which are susceptible to danger are completely removed in the process.

The standard coupling element permits of complete balancing of the assembled shaft portion according to FIG. 13. Balancing can be further improved by rigidifying the double membranes during the balancing process. The coupling condition created by clamping corresponds thereby to the state of the incorporated coupling under nil alignment of the shafts. This measure guarantees the very best running accuracy and permits of ultra-high rotary speeds as a particularly important advantage of this embodiment of coupling.

It is possible even subsequently to alter the rigidity and frequency by means of an elastomeric material inside the standard coupling element. Filling of the double membrane presupposes that there is access from within. The separable connection of the insert 14 permits this. Elastomers also have a damping and insulating effect on vibrations and noise.

The alternative forms of construction illustrated constitute only a choice of those embodiments which most frequently occur. With the unchanging standard coupling element, it is possible to create a number of further embodiments such as, for example:

torsionally resilient embodiments with a torsion shaft as the intermediate sleeve;
electrically insulated embodiments;
embodiments with accurate length adjustment by interposing shims (e.g. prestressed couplings);
axially constrained embodiments with resilient extreme positions;
embodiments with a predetermined fracture point for torque limiting;
embodiments with a quick acting device for torque-related separation.

We claim:

1. A resilient coupling element for use in a torque transmission path and adapted for allowing at least one of axial, radial and angular displacement of adjacent sections of said torque transmission path, said resilient coupling element having an axis and comprising two membrane components (1,2), each of said membrane components (1,2) having a radially outer circumference (D), a radially inner circumference (d) and an annular membrane wall portion (1a,2a) extending radially between said radially outer circumference (D) and said radially inner circumference (d) substantially along a respective plane perpendicular to said axis and having a respective radial length, said membrane components (1,2) being connected with each other at their respective radially outer circumferences (d) by spacer rim means (7,8) extending in axial direction between said two membrane components (1,2) and defining a gap between respective axially opposite faces (1c,2c) of said membrane wall portions (1a,2a) of said two membrane components (1,2), said gap having an axial gap width in an unloaded condition of said coupling element, at least one (2) of said membrane components (1,2) having at its radially inner circumference (d) a connector hub portion, said connector hub portion being welded by an annular radially inner weld (52) to an annular shaft section (4a) of said torque transmission path, said connector hub portion having a radially inward directed, radially inner circumferential face having a diameter corresponding to the diameter of said radially inner circumference (d) of the respective membrane component (2), said shaft section (4a) having a radially inward directed, radially inner circumferential face, said radially inward directed, radially inner circumferential face of said connector hub portion and said radially inward directed, radially inner circumferential face of said shaft section (4a) being in substantial axial alignment with each other, said membrane wall portions (1a,2a) of said membrane components (1,2) having respective wall thicknesses such that said axial gap width is increasable in response to axially opposite pulling forces acting onto said membrane components (1,2) along said respective radially inner circumferences (d) thereof, the increase of axial gap width under action of said axially opposite pulling forces being dependent on the radial location of gap width measuring points along a radial line extending between said radially inner circumferences (d) and said spacer rim means (7,8), the increase of axial gap width being larger at said radially inner circumferences (d) and smaller at said spacer rim means (7,8), said spacer rim means (7,8) having a predetermined rim stiffness against elastic reduction of a radially outer diameter (D) thereof corresponding to said radially outer circumferences (D) of said two membrane components (1,2), said connector hub portion providing a predetermined stiffness against elastic increase of a diameter (d) thereof corresponding to said radially inner circumference (d) of said at least one membrane component (2), said radial length of said membrane wall portion of said at least one membrane component (2) as measured along a radial line in the respective plane perpendicular to said axis being reducible in response to said increase of axial gap width resulting from said axially opposite directed pulling forces, said predetermined rim stiffness of said spacer rim means (7,8) against elastic reduction of its radially outer diameter (D) and said predetermined stiffness against the increase of the inner diameter (d) of said connector hub portion being such that, in response to said increase of axial gap width, both an appreciable diameter reduction (2ΔR) occurs at said spacer rim means (7,8) and an appreciable diameter increase (2ΔR) occurs at said hub portion.

2. The resilient coupling element as set forth in claim 1, said annular radially inner welding zone (52) extending in radially inward direction as far as said radially inward directed, radially inner circumferential faces of both said hub portion and said shaft section (4a).

3. The resilient coupling element as set forth in claim 1, said spacer rim means (7,8) being provided by axially opposite spacer rim portions (7,8) of said two membrane components (1,2), said spacer rim portions (7,8) having respective radially outer circumferential faces, said radially outer circumferential faces (D) of said spacer rim portions (7,8) being axially adjacent and in axial alignment with each other.

4. The resilient coupling element as set forth in claim 1, said connector hub portion being a connector stub portion extending in axial direction away from the respective other membrane component.

5. The resilient coupling element as set forth in claim 1, said gap confined between said membrane wall portions (2a,1a) being at least partially filled with an elastomeric filling composition (60).

6. The resilient coupling element as set forth in claim 5, said elastomeric filling composition (60) being disposed in a radially outer portion of said gap.

7. The resilient coupling element as set forth in claim 1, both said membrane components (1,2) having a respective connector hub portion, both said connector hub portions being connected by welding to respective shaft sections (3a,4a).

8. The resilient coupling element as set forth in claim 7, at least one of said shaft sections (4a,3a) having a radially outward directed flange portion (4b,3b) at an end of said shaft section (4a,3a) remote from the respective membrane component (2,1).

9. The resilient coupling element as set forth in claim 7, both said shaft sections (4a,3a) being disposed at a respective end remote from the respective membrane component (2,1) with a respective radially outward directed flange portion (4b,3b).

10. The resilient coupling element as set forth in claim 9, the respective flange portions (4b,3b) having different axial distances from the respective membrane components (2,1).

11. The resilient coupling element as set forth in claim 10, both said flange portions (4b,3b) having bores therethrough substantially parallel to said axis, said bores being adapted for being occupied by respective bolt-nut units serving to attach further respective shaft sections to the respective flange portions (4b,3b), one (4b) of said flange portions (4b,3b) having an axial distance from the respective membrane component (2) such as to allow a bolt member (6) of a respective bolt-nut unit to be inserted into a respective bore of said flange portion (4b) with a bolt head of said bolt member (6) being disposed axially between said one flange portion (4b) and the respective membrane component (2), of the other one (3b) of said flange portions (4b,3b) having such a distance form the respective membrane component (1) as to prevent insertion of a bolt member (5) of a respective bolt-nut unit into a respective bore of said other flange portion (3b) with a bolt head of said bolt member (5) being located axially between said other flange portion (3b) and the respective membrane component (1), this latter axial distance being large enough to allow a respective nut of said bolt-nut unit to be located axially between said other flange portion (3b) and the respective membrane component (1).

12. A method for manufacturing a resilient coupling element, said resilient coupling element having an axis and comprising two membrane components (1,2), each of said membrane components (1,2) having a radially outer circumference (D), a radially inner circumference (d) and an annular membrane wall portion (1a,2a) extending radially between said radially outer circumference (D) and said radially inner circumference (d) substantially along a respective plane perpendicular to said axis and having a respective radial length, said membrane components (1,2) being connected with each other at their respective radially outer circumferences (D) by spacer rim means (7,8) extending in axial direction between said two membrane components (1,2) and defining a gap between respective axially opposite faces (1c,2c) of said membrane wall portions (1a,2a) of said two membrane components (1,2), said gap having an axial gap width in an unloaded condition of said coupling element, at least one (2) of said membrane components (1,2) having at its radially inner circumference (d) a connector hub portion, said connector hub portion being welded by an annular radially inner weld (52) to an annular shaft section (4a) of said torque transmission path, said connector hub portion having a radially inward directed, radially inner circumferential face having a diameter corresponding to the diameter of said radially inner circumference (d) of the respective membrane component (2), said shaft section (4a) having a radially inward directed, radially inner circumferential face, said membrane wall portions (1a,2a) of said membrane components (1,2) having respective wall thicknesses such that said axial gap width is increasable in response to axially opposite pulling forces acting onto said membrane components (1,2) along said respective radially inner circumferences (d) thereof, the increase of axial gap width under action of said axially opposite pulling forces being dependent on the radial location of gap width measuring points along a radial line extending between said radially inner circumferences (d) and said spacer rim means (7,8), the increase of axial gap width being larger at said radially inner circumferences (d) and smaller at said spacer rim means (7,8), said method comprising:

(a) providing said two membrane components (2,1) and said annular shaft section (4a);

(b) interconnecting said two membrane components (1,2) at said radially outer circumferences (D) and interconnecting said connector hub portion of said at least one membrane component (2) with said annular shaft section (4a);

wherein said interconnecting of said connector hub portion with said annular shaft section (4a) comprises:

(i) axially approaching a substantially axially directed contact face (4c) of said shaft section (4a) against an oppositely directed contact face (2d) of said connector hub portion;

(ii) centering said shaft section (4a) with respect to said connector hub portion by inserting a radially inner, axially directed annular projection (4g) of said shaft section (4a) inside the radially inward directed, radially inner circumferential face (2e) of the respective membrane component (2) while applying a radially outward directed centering face (4f) of said radially inner, axially directed annular projection (4g) against said radially inward directed, radially inner circumferential face (2e) of said connector hub portion;

(iii) continuing said approaching until said axially directed contact face (4c) of said shaft section (4a) abuts said oppositely directed contact face (2d) of said connector hub portion;

(iv) providing a welding seam between said abutting contact faces (4c and 2d) by one of an electron beam or laser beam welding method;

(v) removing material from a radially inner circumferential material zone of said shaft section (4a) with a radial thickness of removal corresponding at least to a radial wall thickness of said annular projection (4g);

(vi) aligning said radially inward directed, radially inner circumferential face (2e) of said connector hub portion with a radially inward directed, radially inner circumferential face of said shaft section (4a) obtained by said removing of material.

13. The method as set forth in claim 12, said welding seam (52) being extended in radially inward direction beyond said radially outward directed centering face (4f) into the material of the shaft section (4a).

14. The method as set forth in claim 13, said membrane components (1,2) being mutually interconnected before interconnecting said connector hub portion of said at least one membrane component (2) with said annular shaft section (4a).

15. The method as set forth in claim 12, at least one annular welding operation being performed between spacer rim portions (7,8) of said membrane components (1,2) for obtaining said spacer rim means, and between a connector hub portion of said at least one of said membrane components (1,2) and said annular shaft section (4a), said at least one annular welding operation being performed while axial engagement pressure is maintained between said spacer rim portions (7,8), and between said connector hub portion and said shaft section (4a), spacer means (30) being clampingly maintained in said axial gap during action of said axial engagement pressure, said spacer means (30) being removed after the respective welding operation.

16. The method as set forth in claim 12, wherein after interconnecting said two membrane components (1,2) and interconnecting said connector hub portion of said at least one membrane component (2) with said shaft section (4a), a bridging sleeve (13,14) is inserted in a gap crossing position so as to be secured to an internal circumferential face on one axial side of said axial gap and to be located on the other axial side of said gap in a radially space relationship with respect to a further internal circumferential face.

17. The method as set forth in claim 13, said membrane components being provided with gap-remote terminal faces (1b,2b) following said planes perpendicular to said axis, and with wall thicknesses of said annular membrane wall portions (1a,2a) decreasing in radially outward direction.

18. The method as set forth in claim 12 wherein radially outer portions of said two membrane discs (1,2) are welded together by one of an electron-beam welding method and a laser beam welding method.

19. The method as set forth in claim 12, said spacer rim means (7,8) being formed by axially adjacent spacer rim portions (7,8) of respective membrane components (1,2), said membrane components (1,2) being provided with said respective spacer rim portions (7,8) having respective external circumferential faces with respective initial diameters (Do), said external circumferential faces being subjected after interconnecting said two membrane components (1,2) to a material removing treatment, so as to obtain a continuous external circumferential face with a final contour.

20. The method as set forth in claim 19, said membrane components (1,2) being provided with gap-remote terminal faces (1b,2b) following said planes perpendicular to said axis in radially outward direction substantially up to said external circumferential faces of said spacer rim portions (7,8), said spacer rim portions (7,8) being conically chamfered after interconnecting said two membrane components (1,2), so as to obtain conical transition faces (7,8) between said continuous external circumferential face and said gap-remote terminal faces (1b,2b).

21. A resilient coupling element for use in a torque transmission path and adapted for allowing at least one of axial, radial and angular displacement of adjacent sections of said torque transmission path, said resilient coupling element having an axis and comprising two membrane components (1,2), each of said membrane components (1,2) having a radially outer circumference (D), a radially inner circumference (d) and an annular membrane wall portion (1a,2a) extending radially between said radially outer circumference (D) and said radially inner circumference (d) substantially along a respective plane perpendicular to said axis and having a respective radial length, said membrane components (1,2) being connected with each other at their respective radially outer circumferences (d) by spacer rim means (7,8) extending in axial direction between said two membrane components (1,2) and defining a gap between respective axially opposite faces (1c,2c) of said membrane wall portions (1a,2a) of said two membrane components (1,2), said gap having an axial gap width in an unloaded condition of said coupling element, at least one (2) of said membrane components (1,2) having at its radially inner circumference (d) a connector hub portion, said connector hub portion being welded by an annular radially inner (52) to an annular shaft section (4a) of said torque transmission path, said connector hub portion having a radially inward directed, radially inner circumferential face having a diameter corresponding to the diameter of said radially inner circumference (d) of the respective membrane component (2), said shaft section (4a) having a radially inward directed, radially inner circumferential face, said radially inward directed, radially inner circumferential face of said connector hub portion and said radially inward directed, radially inner circumferential face of said shaft section (4a) being in substantial axial alignment with each other, said membrane wall portions (1a,2a) of said membrane components (1,2) having respective wall thicknesses such that said axial gap width is increasable in response to axially opposite pulling forces acting onto said membrane components (1,2) along said respective radially inner circumferences (d) thereof, the increase of axial gap width under action of said axially opposite pulling forces being dependent on the radial location of gap width measuring points along a radial line extending between said radially inner circumferences (d) and said spacer rim means (7,8), the increase of axial gap width being larger at said radially inner circumferences (d) and smaller at said spacer rim means (7,8), said gap between respective axially opposite faces (1c,2c) of said membrane wall portions (1a,2a) being at least partially filled with an elastomeric filling composition.

22. The resilient coupling element as set forth in claim 21, said elastomeric filling composition being provided in a radially outer portion of said gap.

* * * * *

UNITED STATES PATENT AND TRADEMARK OFFICE
CERTIFICATE OF CORRECTION

PATENT NO. : 5,364,309
DATED : November 15, 1994
INVENTOR(S) : Guenther Heidrich and Siegfried Muller It is certified that error appears in the above-indentified patent and that said Letters Patent is hereby corrected as shown below:

<u>Col. 5, line 58</u>, "cortically" should read --conically;
<u>Col. 16, line 11</u>, "claim 13" should read --claim 12--;
<u>Col. 16, line 40</u>, "claim 13" should read --claim 12--;
<u>Col. 17, line 33</u>, "inner (52)" should read --inner weld (52)--

Signed and Sealed this

Fourteenth Day of March, 1995

Attest:

BRUCE LEHMAN

*Attesting Officer*     *Commissioner of Patents and Trademarks*